United States Patent [19]

Ookawa

[11] Patent Number: 5,059,022
[45] Date of Patent: Oct. 22, 1991

[54] DEVICE FOR MEASURING RADIUS OF CURVATURE AND A METHOD THEREOF

[75] Inventor: Kaneyasu Ookawa, Kanagawa, Japan
[73] Assignee: Olympus Optical Company Limited, Japan
[21] Appl. No.: 435,716
[22] Filed: Nov. 13, 1989
[30] Foreign Application Priority Data
Nov. 11, 1988 [JP] Japan .................. 63-285357
[51] Int. Cl.$^5$ ............................. G01B 9/00
[52] U.S. Cl. .................. 356/124; 356/125
[58] Field of Search .................. 356/124–127, 356/373; 351/212, 247

[56] References Cited

U.S. PATENT DOCUMENTS 4,609,287 9/1986 Kohayakawa ............ 356/124
4,637,720 1/1987 Shirayanagi et al. ......... 356/124
4,826,315 5/1989 Kohayakawa ............ 356/125

FOREIGN PATENT DOCUMENTS

0118639 6/1986 Japan ............................ 356/124

Primary Examiner—Richard A. Rosenberger
Assistant Examiner—Hoa Pham
Attorney, Agent, or Firm—Bruce L. Adams; Van C. Wilks

[57] ABSTRACT

A device for measuring the radius of curvature of an optical element comprises a point light source or a pinhole, a beam splitter, an imaging optical system for forming a point image, an attaching member for a substance to be tested which is placed on an optical axis of the imaging optical system, a displacing mechanism for changing relative position on the optical axis of the point image, a light receiving element for detecting the point image, a prism for splitting the pupil by four comprising four wedge prisms having wholly different wedge directions and arranged between the light receiving element and the beam splitter, an image instrumentation section for detecting respective barycenter or center positions of four point images formed on the light receiving element and for calculating the displaced amount or the amount proportional to displacing differences of the point image from the reference image plane, and a display section for displaying the calculated result.

8 Claims, 7 Drawing Sheets

FIG.7(a) ON DEFORCUS

FIG.7(b) ON FORCUS

FIG.7(c) ON ROTATION

DEVICE FOR MEASURING RADIUS OF CURVATURE AND A METHOD THEREOF

BACKGROUND OF THE INVENTION

The present invention relates to a device for measuring radius of curvature, more particularly, a device for measuring and testing radius of curvature of an optical lens and a spherical mirror and a method thereof.

Figures 6, 7, 8:
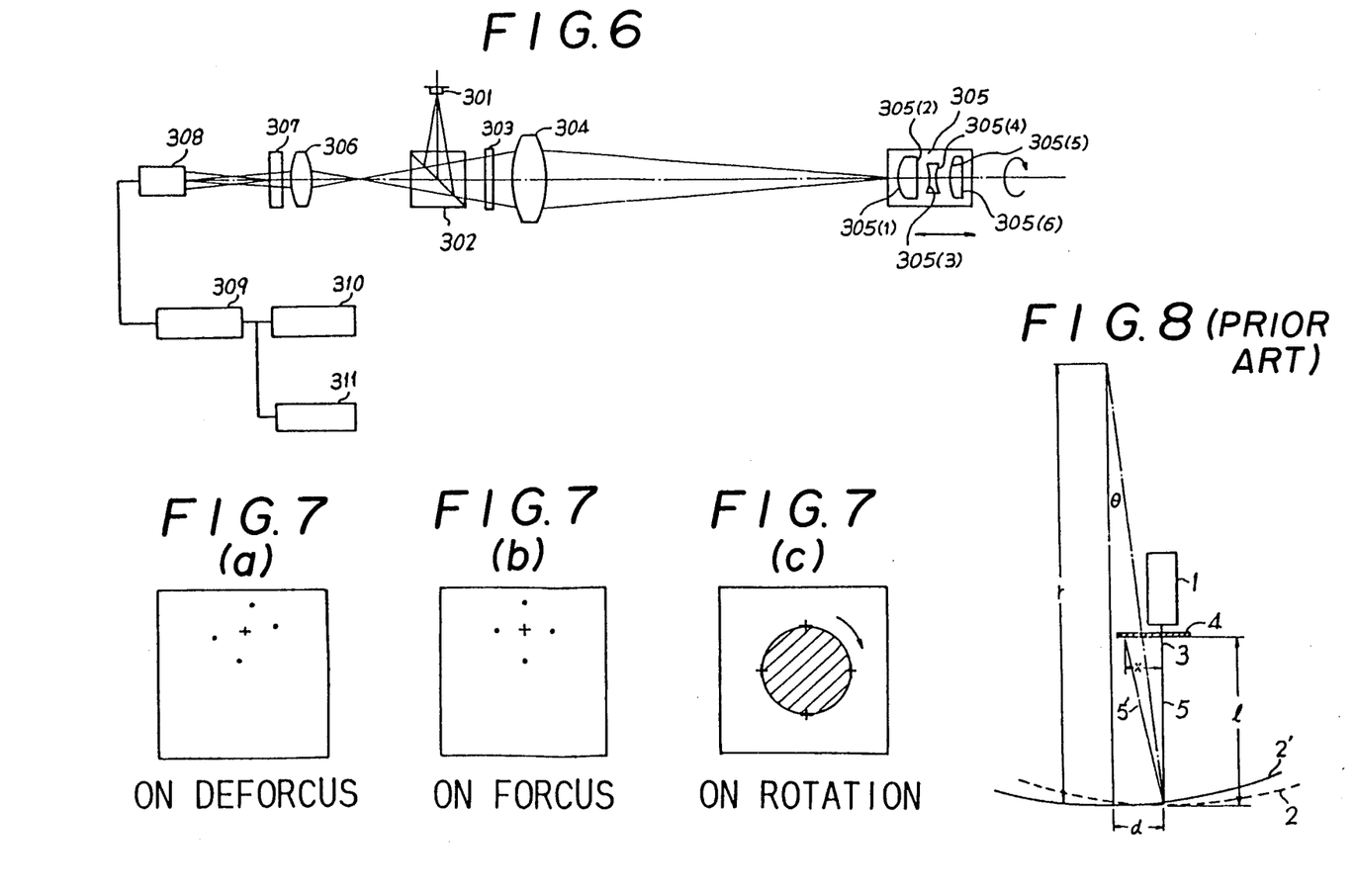
FIG. 6 is a plan view showing the construction of a third embodiment of the device for measuring radius of curvature according to the present invention.
FIG. 8 is a plan view showing the construction of the conventional device for measuring radius of curvature.

Such a device for measuring radius of curvature comprises, as shown in FIG. 8, a laser source which is so arranged that collimated light beam 3 having a small radius is illuminated on a surface 2 on which the radius of a substance is measured. The substance to be measured moves in the tangential direction at the measuring point on the surface at which the curvature is to be measured, through an infinitesimal distance by a driving device (not shown), for example, the driving device such as a micromoter. A projection plate 4 is arranged between the laser light source 1 and the substance to be measured in parallel with a virtual osculating plane at the measuring point of the measuring surface so that the projecting position of the laser beam reflected on the measuring point can be designated.

In the apparatus thus constructed, the curvature of the measuring point is obtained as follows. The substance to be measured is, in the first place, moved and the driving device is adjusted in such a manner that the centered or illuminated laser beam 3 is again returned in the same position, thereby incident angle $\alpha$ becoming zero. This zero incident angle $\alpha$ is shown in FIG. 8 by a broken line 2. The substance to be measured is displaced in the tangential direction at the measuring point by the infinitesimal distance d. The position of the measuring surface thus displaced is shown in FIG. 8 by a solid line 2'. The reflection direction of the reflected laser beam is changed from 5 to 5' by such a diaplcement so that the projected position is also displaced by the infinitesimal distance x. Supposing that the incident angle of the laser beam 3 to the measuring surface 2' is $\theta$ after displacement, the distance between the projection plate 4 and the osculating plane of the measuring surfaces 2, 2' is l the radius of curvature is $\gamma$, and x, d < l, $\gamma$, $\theta$ may be made very small, and proximated to $\theta \sim \sin \theta \sim \tan \theta$. Therefore, following relations are obtained.

$$x \sim 1 \cdot 2\theta \tag{1}$$

$$\gamma \theta \sim d \tag{2}$$

From these equations (1) and (2), is removed, the radius of curvature $\gamma$ is obtained as follows.

$$\gamma = 2dl/x \tag{3}$$

In the actual measurement, the displacement position d of the substance to be measured by which a constant value x may be obtained, is preferably measured. In this way, the accuracy of measurement may be increased. For example, when a slit is provided at the predetermined position of the projection plate and a photo detector is arranged behind the slit, the laser beam reflected from the measuring position is detected through the slit in case of displacing the substance to be measured and thus the displacement distance of the substance to be measured may be obtained.

In the above conventional device for measuring radius of curvature, the measuring precision of radius of curvature is determined by the measuring resolution of x and d, so that the smaller the radius of curvature the smaller the value of d and thus the accuracy of measurement becomes decreased relatively. Moreover, the radius of curvature can not be measured for the substance having a thick rear face.

SUMMARY OF THE INVENTION

It is an object of the present invention to eliminate the above disadvantages of the conventional device for measuring radius of curvature, preferably of a lens.

It is another object of the present invention to provide a method and a device for measuring radius of curvature, which is of the non-contact type and capable of measuring and checking radius of curvature with high precision from small to large radius of curvature.

It is other object of the present invention to provide a method of measuring to adjacent spherical surfaces of a lens to be tested, that is, the thickness of the lens surface, or the spacing between lens surfaces, in addition to the measurement of radius of curvature.

According to the present invention, there is provided a device for measuring radius of curvature comprising a point light source or a pinhole, a beam splitter, an imaging optical system for forming a point image, an attaching member for a substance to be tested which is placed on an optical axis of the imaging optical system, a traversing mechanism for changing relative position light path length) on the optical axis o the point image which is formed by the attaching member and the imaging optical system, a length measuring member for measuring the position of the traversing mechanism, a light receiving element for detecting the point image formed by the light reflected from the tested substance behind the beam splitter, a prism or splitting a pupil by four which is formed by four wedge prisms each having wholly different wedge directions and is arranged between the light receiving element and the beam splitter, an image instrumentation section for detecting respective barycenter or center position of our point images formed on the light receiving element by split light flux with the splitting prism and for calculating the displaced amount or the amount proportional to the displaced difference of the point image from the reference image plane, and a display section for displaying the calculated result.

According to the present invention, there is further provided a method of measuring radius of curvature comprising steps of illuminating the light on a surface to be tested from a point light source or a pinhole through an imaging optical system, detecting a displaced amount or an amount proportional to the displaced difference from a reference position along an optical axis of image points formed by a light flux reflected from the surface to be tested through four wedge prisms each having wholly different wedge directions, and measuring a difference between two different positions of the surface to be tested along an optical axis so as to make the detected amount zero (the position in the case of displaced difference being zero from two reference positions corresponding to surface image and spatial image).

A method of measuring radius of curvature comprises steps of illuminating the light on a lens to be tested from a point light source or a pinhole through an imaging optical system, detecting a displaced amount or an amount proportional to the displaced difference from a reference position along an optical axis of image points formed by a light flux reflected from the surface to be tested through four wedge prisms each having wholly different wedge directions, measuring positions of the surface to be tested along an optical axis corresponding to two adjacent reflecting sperical surfaces of the lens so as to make the detected amount zero (the position in the case of the displaced amount being zero from the reference position corresponding to the surface image each reflected from adjacent two spherical surface), and calculating a surface separation (thickness or spatial interval) of adjacent two spherical surface, from the thus measured value, from radius of curvature, displaced amount and the surface separation of whole optical surface of the lens at the side of the imaging optical system from the surface close to the imaging optical system of two adjacent spherical surfaces, and from the refractive index of whole material of the lens at the side of the imaging optical system to the surface far away from the imaging optical system.

A method of measuring radius of curvature comprises steps of illuminating the light on a lens to be tested from a point light source or a pinhole through an imaging optical system, detecting a displaced amount or an amount proportional to the displaced difference from a reference position along an optical axis of image points formed by a light flux reflected from the surface to be tested through four wedge prisms each having wholly different wedge directions, measuring two different positions of the lens to be tested along an optical axis corresponding to the internal optical surface of the lens so as to make the detected amount zero (the positions in the case of the displaced amount being zero from both reference positions corresponding to the surface image and the spatial image reflected from the optical surface to be tested) and calculating radius of curvature of the internal optical surface to be tested of the lens, from the measured value, the radius of curvature of the whole optical surface of the lens at the side of the imaging optical system from the optical surface to be tested, the refractive index and the surface separation of the material of the lens.

BRIEF DESCRIPTION OF THE DRAWINGS

FIGS. 7a to 7c are plan views showing the reflecting image points of the device.

DETAILED EXPLANATION OF THE PREFERRED EMBODIMENTS

Now to the drawings, there is shown one embodiment of a device for measuring radius of curvature according to the present invention.

Figure 1:
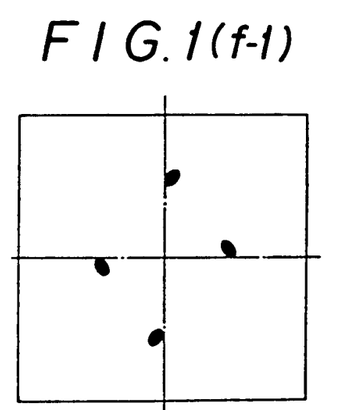
FIGS. 1a and 1b are explanatory views showing a principle of a device for measuring radius of curvature according to the present invention.
FIGS. 1c to 1e are perspective views showing a prism for splitting pupil by four and reflecting image points of the device according to the present invention.
FIGS. 1f to 1g are plan views showing the reflecting image points of the device.
Figure 1A:
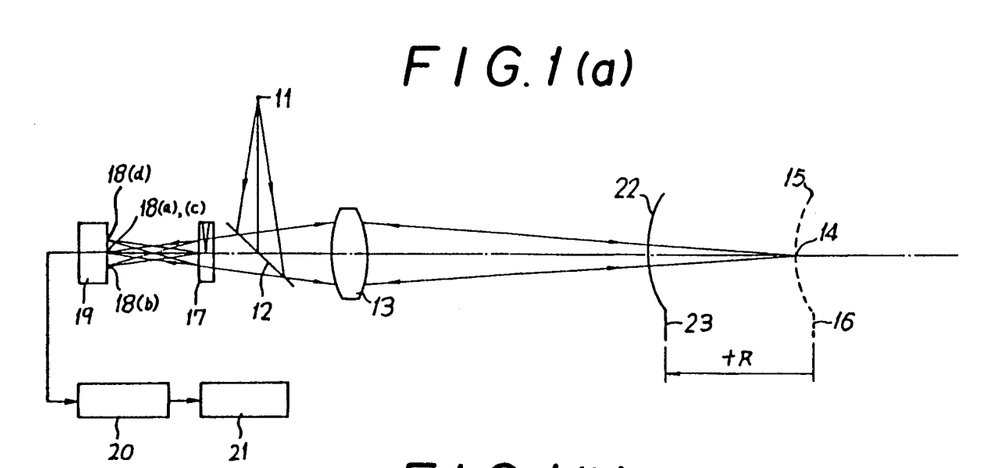
Figure 1B:
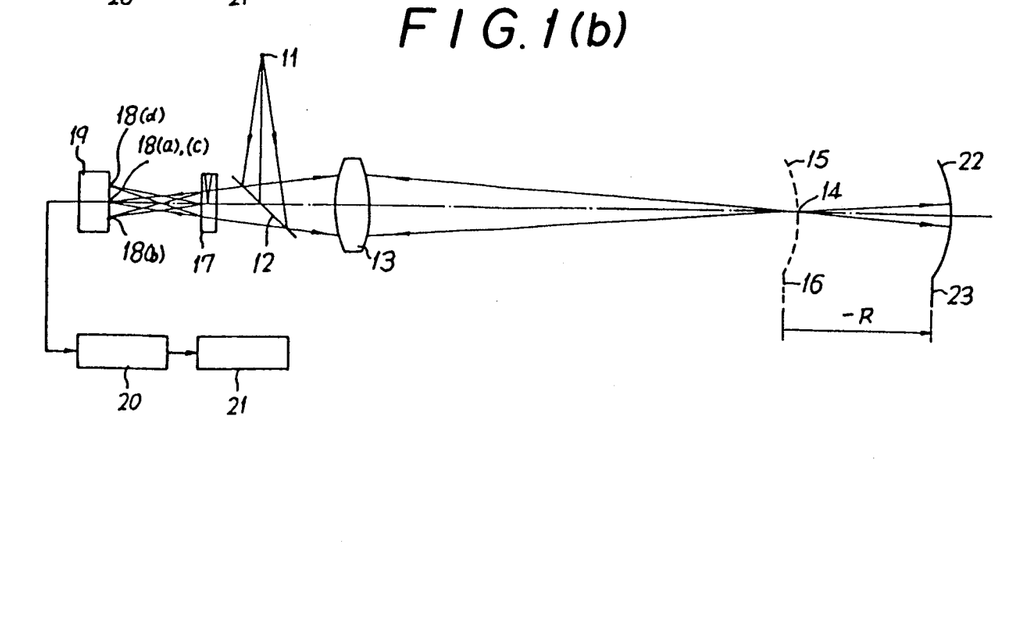
Figures 1C, 1D:
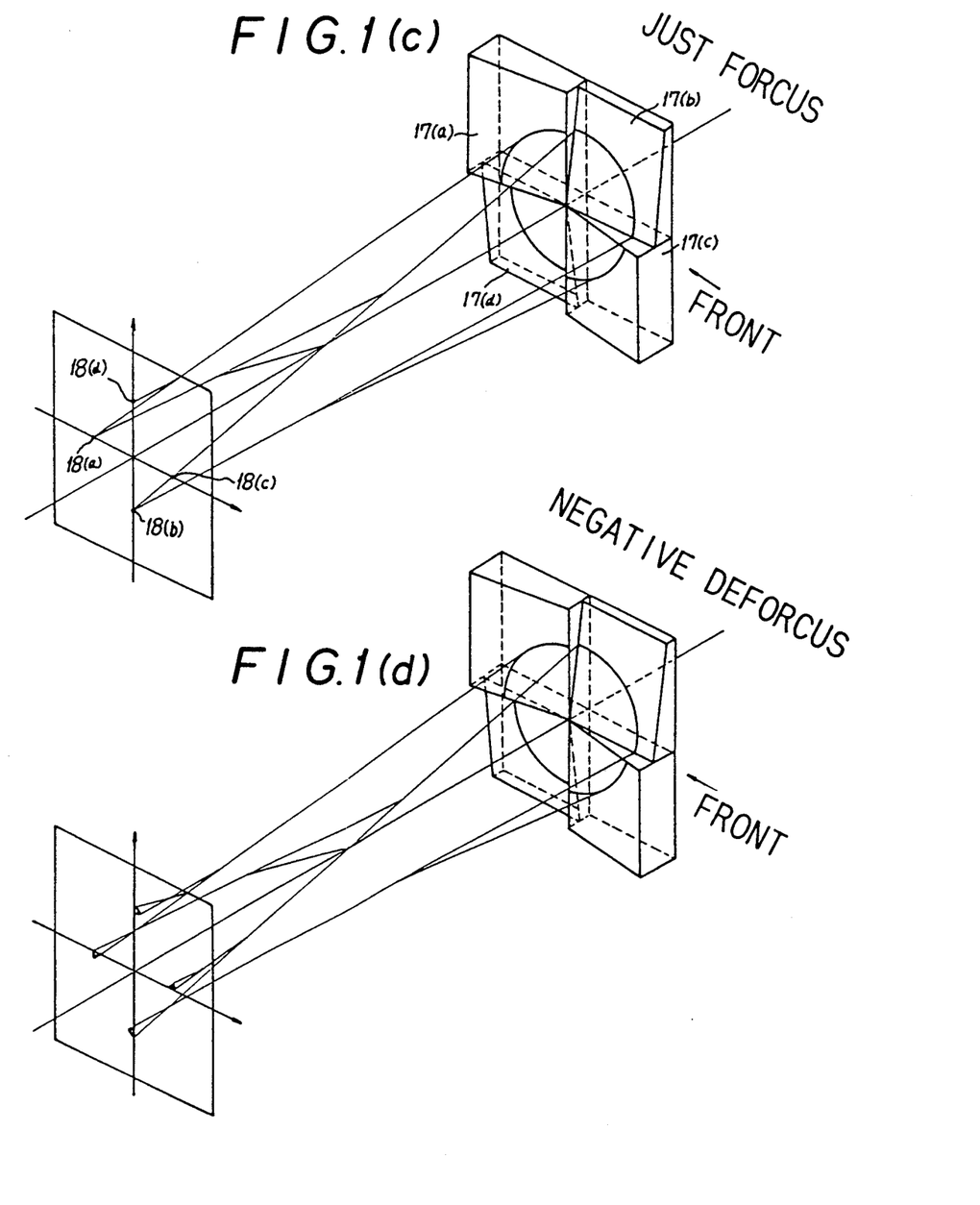

As shown in FIGS. 1a and 1b, the device for measuring radius of curvature according to the present invention comprises the following elements. That is, reference numeral 11 is a point light source or a pinhole constucted by laser light or the like. Reference numeral 12 is a beam splitter, such as a half-mirror, a semitransparent prism or the like, numeral 13 is an imaging optical system for forming an image of the point source 11, numeral 14 is an imaging point, numeral 15 is a surface or plane to be measured or tested, and numeral 16 is a fitting portion (attaching member) of an object to be tested. These elements 11 to 16 are arranged as shown in FIGS. 1a and 1b. In this case, supposing that the imaging point 14 of the object 16 to be tested corresponds to the center portion of the surface 15 to be tested. Reference numeral 17 is a prism for splitting the pupil by four which is arranged in a light path at the side of the beam splitter 12 opposite to the point light source 11 and, as shown in FIG. 1c, consists of four wedge prisms each having different wedge directions. Numeral 18 is a point reflected from the surface 15 to be tested at the position of the beam splitter 12 conjugated to the point source 11. There are four reflected point images 18a to 18d as shown in FIG. 1c. Reference numeral 19 is a light receiving element for detecting barycentre position of four point images 18a to 18d, numeral 20 is an arithmetic operating unit for calculating an amount proportional to the displaced amount of the point image from the reference image surface (conjugated position of the point source 11), and numeral 21 is a display unit for displaying the calculated result of the operating unit 20. The device according to the present invention comprises a traversing mechanism (not shown) for moving the attaching or fitting portion 16 of the object to be tested along an optical axis, and a length measuring unit (not shown) for measuring the traversed amount of the traversing mechanism.

Figure 1E:
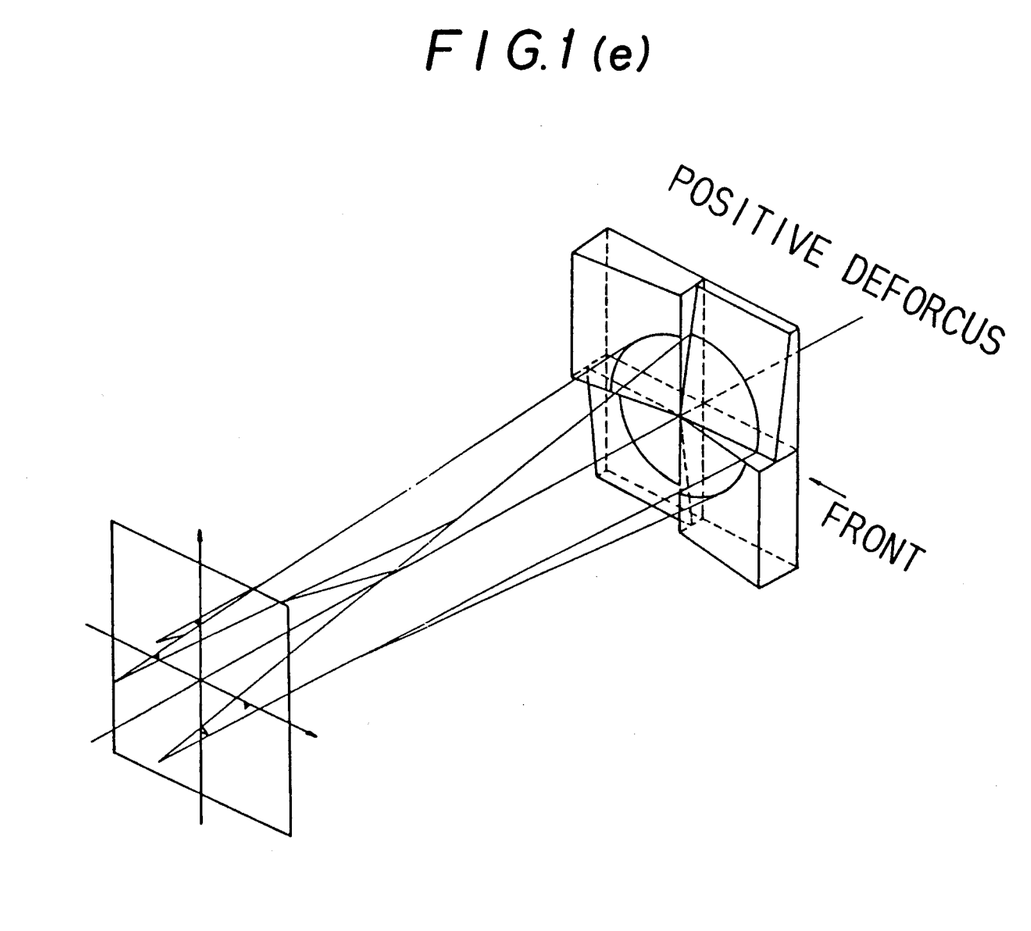
Figure 1F:
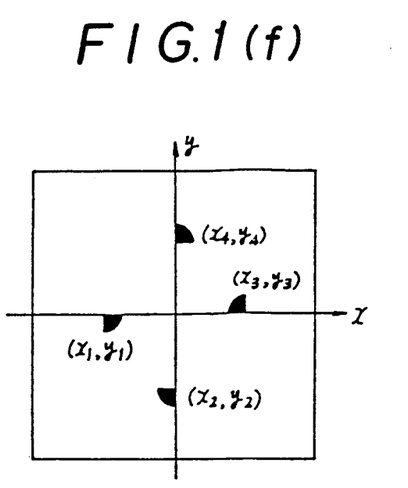

The operation of the device for measuring radius of curvature according to the present invention is described as follows. The light flux emitted from the point source 11 is reflected by the beam splitter 12 as a halfmirror and imaged on the imaging point 14 by the imaging optical system 13. When the surface vertex of the surface to be tested and the imaging point 14 are close to each other by moving the fitting portion 16, the light flux reflected from the tested surface 15 passes through the imaging optical system 13, the beam splitter 12 and the prism 17 for splitting the pupil by four to condense it on or near the reflected points 18. The prism 17 divides or splits the light flux into four equal parts. That is, a quadrant light flux passed through a split prism portion 17a is condensed or gathered on the reflected image point 18a, a quadrant light flux passed through a split prism portion 17b is condensed or gathered on the reflected image point 18b, a quadrant light flux passed through a split prism portion 17c is condensed or gathered on the reflected image point 18c, and a quadrant light flux passed through a split prism portion 17d is condensed or gathered on the reflected image point 18d. In this case, when the surface vertex of the tested surface 15 is placed at a right side of the imaging point 14, the position of gathered light point (point image) is positioned at the right side of the light receiving surface so that the image pattern on the light receiving surface becomes as shown in FIG. 1f considering the geometric optics.

Figure 1G:
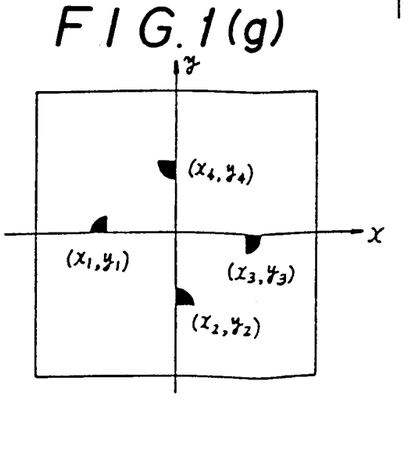

When the surface vertex of the reflected surface 15 is positioned at the left side of the imaging point 14, on the contrary, the pattern image is obtained as shown in FIG. 1g. This image pattern may actually be considered as wave optics, in this case, four images become an elliptical in shape of ellipticity 1:$\sqrt{2}$ each having the same barycentre. The pattern of this elliptical shape is shown in FIG. 1 f-1 which corresponds to the pattern shown in FIG. 1f. If the object point is not a pinhole the pattern of the image becomes the shape of the object point. For example, the object point is a circle point having a certain size, the pattern thereof is shown as a complete circular in FIG. 1 f-2 which also corresponds to the pattern shown in FIG. 1f. Such a circular image pattern may be subjected to the image processing with high speed. The pattern shown in FIG. 1g is the same as the above explanation.

Supposing that the coordinates of four image points are determined as $(x_1, y_1)$, $(x_2, y_2)$, $(x_3, y_3)$ and $(x_4, y_4)$. an infinitely small portion A of the coordinate is considered as follows.

$$\Delta = (x_2 - x_4) + (y_1 - y_3)$$

If the displaced amount of surface vertex of the tested surface 15 from the imaging point 14 is defined as $\delta$ (positive at left side), the small portion may be designated as $\Delta = k\delta$, wherein k is a constant other than zero and is determined by a magnification and a brightness due the imaging optical system 13. When $\Delta = 0$, therefore, the surface vertex of the tested surface 15 is coincident with the imaging point 14. This small portion $\Delta$ is calculated by an operating unit 20 and displayed by the display unit 21, so that while monitoring the display of the displaying unit 21, the fine adjustment may be performed by moving the fitting portion 16 of the object to be tested again so as to make it zero. With this operation, the surface vertex of the tested surface 15 may be coincident with the imaging point 14 and thus the position of the attaching portion 16 is reset as a length measuring origin.

Then, the attaching portion 16 is again moved to the left side in the case of the surface 15 being a convex and to the right side in the case of the surface 15 being a concave, thereby again forming a point image on the light receiving surface. This point image forming position is shown as a surface 22 to be tested (corresponding to the surface 15 to be tested) and an attaching portion 23 (corresponding to the attaching portion 16) in FIGS. 1a and 1b. This image is referred hereinafter to as a spatial image. On the contrary, an image formed in the state that the surface vertex of the surface 15 is coincident with the attaching portion 16, is referred to as a surface image.

Therefore, the attaching portion 23 is subjected to the fine adjustment in the same manner as the above fine adjustment so as to make the surface value of the display unit 21 zero by the same means as in the surface image, and then the position of the attaching portion 23 from the origin is measured by the length measuring unit, and finally, the measurement of radius of curvature is finished by defining the thus measured value as a radius of curvature of the surface to be tested.

Figures 2, 3, 4:
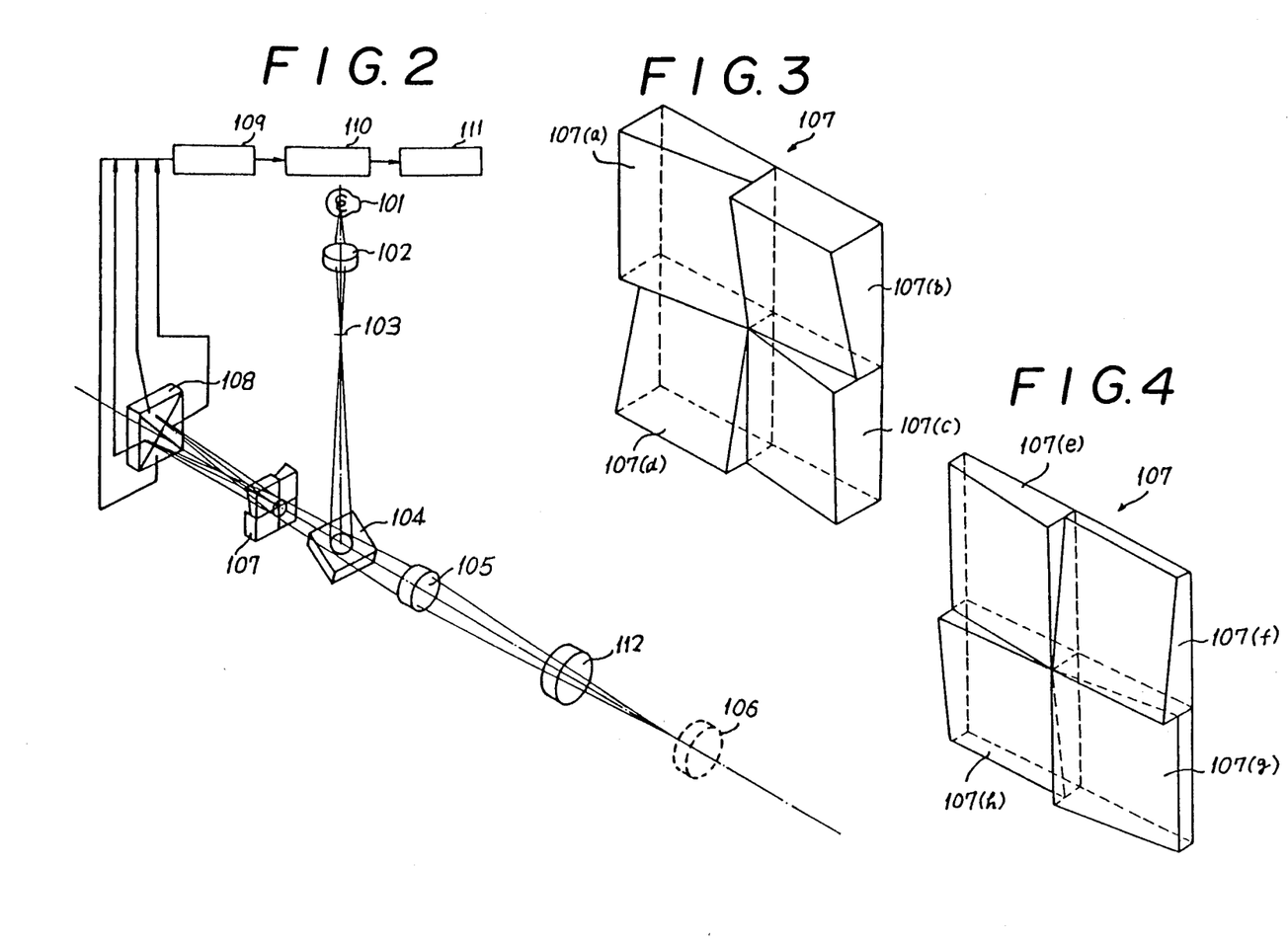
FIG. 2 is an explanatory view showing the construction of a first embodiment of a device for measuring radius of curvature according to the present invention.
FIGS. 3 and 4 are perspective views showing the construction of the prism for splitting a pupil by four.

FIG. 2 shows a first preferred embodiment of a device for carrying out a method of measuring radius of curvature according to the present invention. In this embodiment, as shown in FIG. 2, the device comprises the following elements. Reference numeral 101 is a halogen lamp, numeral 102 is a lens for illumination, numeral 103 is a pinhole, numeral 104 is a half-mirror, numeral 105 is an imaging optical system for forming an image of the pinhole 103, and numeral 106 is a position of a lens to be tested in the case that the surface vertex of the lens is coincident with an imaging point of the pinhole 103. Reference numeral 107 is a prism for splitting a pupil by four, numeral 108 is a detecting element consisting of four optical position detecting elements, numeral 109 is an amplifier unit for amplifying the output signal of the detecting element 108, numeral 110 is an arithmetic operating unit for calculating an amount proportional to the displaced amount of point image, and numeral 111 is a display unit. These elements 101 to 111 are arranged as shown in FIG. 2. The device also comprises a transversing mechanism (not shown) or moving the lens 106 to be tested along an optical axis and a length measuring unit (not shown) for measuring the moved amount thereof. A lens 112 to be tested shows the moved condition of the lens 106. The device in this embodiment utilizes a prism shown in FIG. 3 and 4 as a prism for splitting pupil by four. That is, the prisms shown in FIGS. 1c to 1e are constructed by joining a wedge prism having a thick center portion and a wedge prism having a thin center portion, alternately. On the contrary, the device shown in FIG. 3 utilizes only prisms each having thin center portion and the device shown in FIG. 4 utilizes only prisms each having a thick center portion. The prism or splitting a pupil by four shown in FIG. 1 may also be utilized.

In this embodiment, the light flux emitted from the halogen lamp 101 illuminates the pinhole 103 through the illustrating lens 102. An image of the pinhole 103 is reflected by the half-mirror 104 and imaged on the lens 106 through the image optical system 105. When the imaging position is coincident with the surface image position of the lens 106 as shown at the position of the lens 106, the operating unit 110 supplies a zero output. Then, the displaced amount of the surface vertex becomes an amount proportional to the amount $(x_2 - x_4) - (y_1 - y_3)$, so that the amount proportional to the amount $(x_2 - x_4) - (y_1 - y_3)$ is outputted from the operating unit 110. When the lens 106 is moved to the extent of radius of curvature on the optical axis as shown at the position of the lens 112, the signal corresponding to this traversed amount is outputted from the operating unit 110 so that the lens to be tested is subjected to the fine adjustment so as to make this output zero, and thus radius of curvature may be obtained by measuring the position after the fine adjustment to the position upon completing the fine adjustment and at the measurement of the surface vertex by the length measuring section. The output of the operating unit 110 may be adjusted while monitoring the display unit 111. The output of the detecting element 108 is a voltage signal corresponding to respective x and y directions, so that this output signal is amplified by the amplifier unit 109 and supplied to the operating unit 110.

According to this embodiment, four prisms constructing a split prism may be made the same construction and the utilization of optical position detecting element leads to a cheap device.

Figure 5:
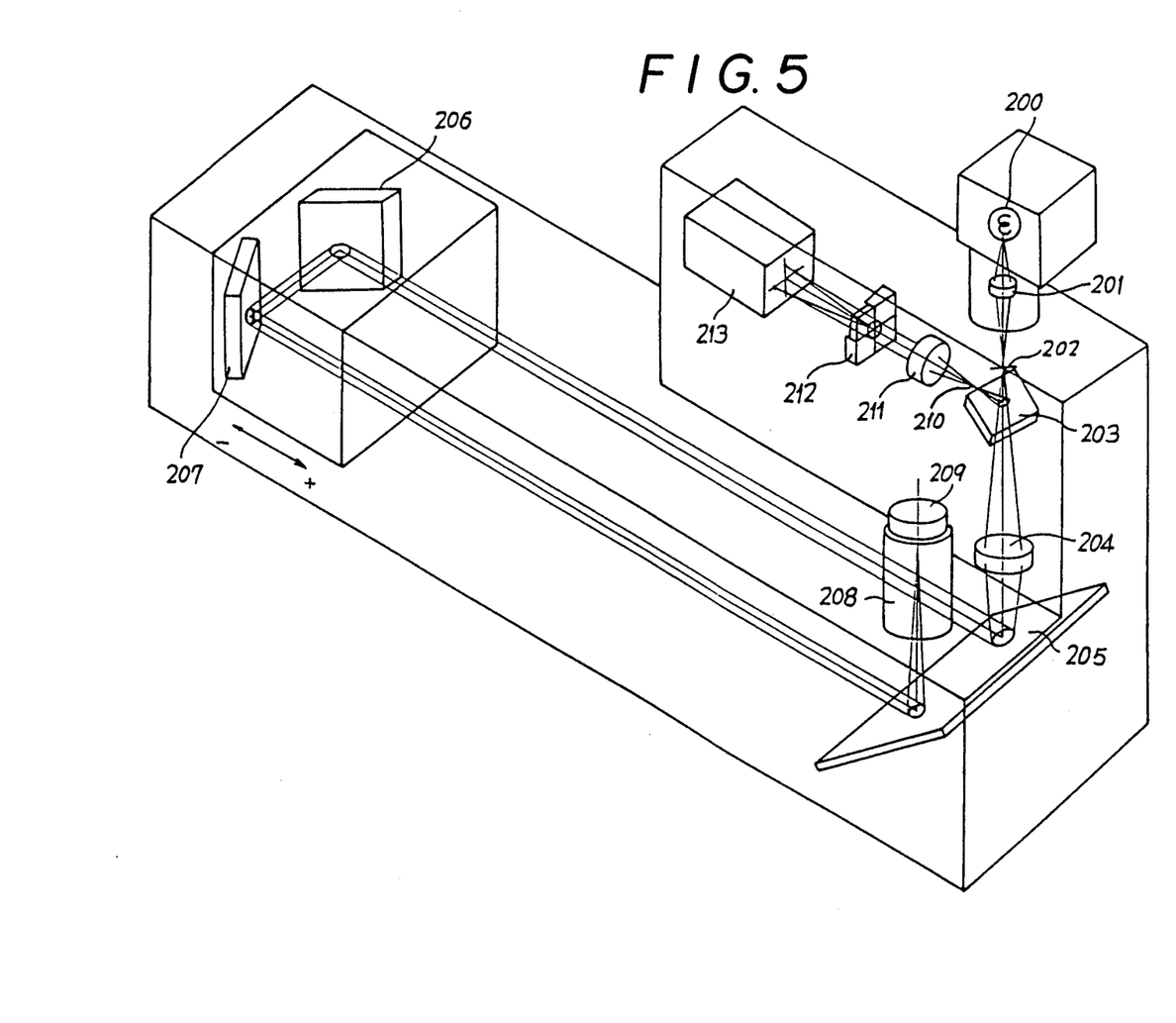
FIG. 5 is a perspective view showing the construction of a second embodiment of the device for measuring radius of curvature according to the present invention.

FIG. 5 shows a second preferred embodiment of a device for measuring radius of curvature according to the present invention. In this embodiment, as shown in FIG. 5, the device comprises the following elements. Reference numeral 200 is a halogen lamp, numeral 201 is an illuminating lens, numeral 20 is a pinhole, numeral 203 is a half-mirror, numeral 204 is an imaging optical system, numeral 205, 206 and 207 are total reflection mirrors, numeral 208 is a holder, numeral 209 is a lens to be tested, numeral 210 is an image point, numeral 211 is a relay lens for projecting to a television camera by magnifying or reducing the image point 210, numeral 212 is a prism for splitting a pupil by four arranged near the exit pupil of the relay lens 211, and numeral 213 is a television camera. These elements 200 to 213 are arranged as shown in FIG. 5. The total reflection mirrors 206 and 207 are mounted in a box to move them on an optical axis. The device according to this embodiment also comprises a length measuring unit (not shown) for measuring the traversed amount of these mirrors, an image instrumenting unit (not shown) for processing the output of the television camera 213 and a monitor (not shown). The lens 209 is placed on the holder 208 and adjusted to position the center of curvature on an optical axis.

According to the present embodiment, the light flux emitted from the halogen lamp 200 illuminates the pinhole 202 through the illuminating lens 201. The pinhole image is formed as an image near the lens 209 through the imaging optical system 204, so that the imaging point may be changed by moving the total reflection mirror 206, 207 on the optical axis. The imaging point may be coincident with the position near the surface vertex under the lens 209 by the change of the imaging point, so that four pinhole images may be monitored on a monitor (not shown). As this condition, the output of the image instrument unit is reset to zero. Similarly, the imaging point may be coincident with the position near the center of curvature under the lens 209 by moving the total reflection mirrors 206, 207 in the same manner as the above, so that four pinhole images may be monitored on the monitor (not shown). Under such a condition, the total reflection mirrors 206, 207 are subjected to the fine adjustment and moved to make the output of the image instrumenting unit zero, so that too times the output of the length measuring unit may be defined as radius of curvature. The relay lens 211 serves to increase detecting or measuring precision by magnifying the pinhole image and to make mechanical adjustment easy, by which elements 211 to 213 are made a unit and the detected value is made zero in the case of imaging at the position conjugated to the pinhole 202. The total reflection mirror 205 is provided to obtain a stable detection by only placing the lens to be tested thereon. The total reflection mirrors 206 and 207 are provided to make the whole device compact.

According to this embodiment, a compact and easy operable device, may be obtained with high precision.

FIG. 6 shows a third preferred embodiment of a device for measuring radius of curvature according to the present invention. In this embodiment, as shown in FIG. 6, the device comprises the following elements. Reference numeral 301 is a semiconductor laser, numeral 302 is a polarizing prism, numeral 303 is a quarter-wave plate, numeral 304 is an imaging optical system and numeral 305 is a lens to be tested. Respective surfaces to be tested thereof are shown by numerals 305(1) to 305(6). Reference numeral 306 is a relay lens, numeral 307 is a prism for splitting a pupil by four, numeral 308 is a CCD camera, numeral 309 is an image instrumenting unit, numeral 310 is a monitor, and numeral 311 is a printer. These elements 301 to 311 are arranged as shown in FIG. 6. The device also comprises a traversing mechanism (not shown) for moving the lens 305 on an optical axis, a rotating mechanism (not shown) for rotating about the optical axis and a length measuring unit (not shown) for measuring the traversed amount thereof. The polarizing prism 302 and the quarter-wave plate 303 serve to make the loss of the light quantity of the semiconductor laser 301 small and are arranged in a particular positional relation to the polarizing surface of the laser 301. The relation is well known and its explanation is omitted. When a lens for changing NA is inserted between the semiconductor laser 301 and the polarizing prism 302, the loss of light quantity may be made more small.

In this embodiment, the light flux emitted from the semiconductor laser 301 is reflected by the polarizing prism 302 and is incident onto the imaging optical system 304 through the quarter-wave plate 303. The light flux incident on the imaging optical system 304 is converged and incident onto the lens 305. When the convergent point is coincident with the surface vertex of the surface 305 (1), the light flux reflected by the surface 305 (1) is returned to the polarizing prism 302 along the previous optical path. The converged light flux incident on the polarizing prism 302 is not reflected thereby and passed therethrough to form a point image at the position conjugated to the semiconductor laser 301. This point image is amplified or reduced by the relay lens 306 and projected onto the CCD camera 308. In this case, four point images are formed by the prism 307 for splitting a pupil by four in the same manner as in the previous embodiments (see FIG. 7a). Then, the barycenter positions of respective point images are detected by the image instrumenting unit 309, and operated and processed and then display its result on the monitor 310. After the fine adjustment is performed to make the displayed value zero (see FIG. 7b for four images), the length measuring display is reset. Then, the lens 305 is moved so as to coincide the converging point with the center of curvature of the surface 305 (1) and the fine adjustment is performed to make the displayed value of the monitor 310 zero, so that the radius of curvature of the surface 305 (1) may be obtained. When the lens 305 is rotated the average coordinate value of the four point image is changed to obtain a circular locus as shown in FIG. 7c. When the radius of rotation of this locus is multiplied by the proportional constant, the decentering amount of the surface 305 (1) may also be obtained. When the lens 305 is moved to obtain four surface images by the reflected light of the surface 305 (2) and then is subjected to the fine adjustment to make the displayed value zero, the position of the lens 305 may be detected by the length measuring unit, so that the surface separation (the thickness of lens) of the surfaces 305 (1) and 305 (2) may be obtained by the thus detected value, the detected radius of curvature and the decentering amount of the surface 305 (1) and the refractive index (known) of the material of the surface 305 (1) and 305 (2). In this embodiment, the above measurement is performed for one lens (in this case, $d_1 = f(R_1, n_1, \delta_1)$), but the above measurement may be performed for a plurality of lenses. In this case, $d_m$ (surface separation) may be shown as follows. $D_m = f(R_1, R_2, \ldots, R_m, d_1, d_2, \ldots, d_{m-1}, n_1, n_2, \ldots, n_m, \delta_1, \delta_2, \ldots, \delta_m)$ When the lens 305 is moved to obtain four spatial image by the reflected light of the surface 305 (2) and then is subjected to the fine adjustment to make the displayed value of the monitor zero, the position of the lens 305 may be detected by the length measuring unit, so that the radius of curvature of the surface 305 (2) may be obtained by the thus detected value, the above detected value and the refractive index thereof. Moreover, when the lens 305 is further rotated, the decentering of the surface 305 (2) may also be detected by the above detected values and the refractive index thereof.

In this way, when the material of the transmitting section is well known, the radius of curvature, the surface separation and the decentering amount of a respective surface may be precisely obtained irrespective of the number of construction lenses. In this case, it is necessary to recognize whether the reflected image is obtained by which surface of the lens.

What is claimed is:

1. A device for measuring radius of curvature of a surface, comprising a point light source, a beam splitter, an imaging optical system for forming a point image, an attaching member for a surface to be tested, a light receiving element disposed behind the beam splitter for detecting the point image formed by light reflected from the surface, a prism for splitting a pupil by four comprising four wedge prisms each having wholly different directions and arranged between the light receiving element and the beam splitter, an image instrumentation section for detecting respective barycenter or center position of four point images formed on the light receiving element by split light flux with the pupil splitting prism and for calculating the displaced amount or the amount proportional to a displaced difference of the point image from the reference image plane, and a display section for displaying the calculated result.

2. A method of measuring radius of curvature of a surface, comprising the steps of illuminating light on a surface from a point light source through an imaging optical system, detecting an amount proportional to a displaced different from a reference position along an optical axis of image points formed by a light flux reflected from the surface through four wedge prisms each having wholly different directions, and measuring a difference between two different positions of the surface along an optical axis to make the detected amount zero.

3. A method of measuring radius of curvature of a lens to be tested, comprising the steps of illuminating light on a lens to be tested from a point light source through an imaging optical system, detecting an amount proportional to a displaced difference from a reference position along an optical axis of image points formed by a light flux reflected from the surface through four wedge prisms each having wholly different directions, measuring positions of the lens to be tested along an optical axis corresponding to two adjacent reflecting spherical surfaces of the lens so as to make the detected amount zero, and calculating a surface separation of the two adjacent spherical surfaces from the thus measured value, from radius of curvature, from a displaced amount, from the surface separation of the whole optical surface of the lens at the side of the imaging optical system from the surface close to the imaging optical system of the two adjacent spherical surfaces, and from the refractive index of the whole material of the lens at the side of the imaging optical system to the surface far away from the imaging optical system.

4. A method of measuring radius curvature, comprising the steps of illuminating light on a lens to be tested from a point light source through an imaging optical system, detecting an amount proportional to a displaced difference from a reference position along an optical axis of image points formed by a light flux reflected from the surface to be tested through four wedge prisms each having wholly different directions, measuring two different positions of the lens to be tested along an optical axis corresponding to internal optical surfaces of the lens so as to make the detected amount zero, and calculating radius of curvature of an internal optical surface of the lens from the measured value, the radius of curvature of the whole optical surface of the lens at the side of the imaging optical system from the optical surface to be tested, the refractive index and the surface separation of the material of the lens.

5. A device for measuring the radius of curvature of a surface, comprising: means for producing a point of light, an imaging optical system for forming a point image from the point of light; means for positioning a surface to be measured along an optical axis of the imaging system; a beam splitter for directing the point of light to the imaging optical system light; receiving means disposed behind the beam splitter for detecting the point image; a prism for splitting a pupil by four comprising four wedge prisms each having different directions and arranged between the receiving means and the beam splitter; means for detecting a center position of four point images formed by the prism on the light receiving element and for calculating an amount proportional to the displacement of the point image from a reference image plane; and means for displaying the calculated result.

6. A method of measuring a radius of curvature of a surface, comprising the steps of: illuminating a surface with a point light; forming four image points from light reflected from the surface by four wedge prisms having different directions; detecting an amount proportional to a displacement from a reference position of the image points; and measuring a difference between two positions of the surface along an optical axis to make the detected amount zero.

7. A method of measuring a radius of curvature of a lens, comprising the steps of: illuminating a lens with a point of light; forming four image points from light reflected from the lens by four wedge prisms each having different directions; detecting an amount proportional to a displaced difference from a reference position along an optical axis of the image points; measuring positions of the lens along an optical axis corresponding to two adjacent reflecting spherical surfaces of the lens; and calculating a surface separation of the two adjacent spherical surfaces as a function of the measured positions.

8. A method of measuring a radius curvature, comprising the steps of: illuminating a lens with a point of light; forming four point images from light reflected from the lens by four wedge prisms each having different directions; detecting an amount proportional to a displaced difference from a reference position along an optical axis of the image points; measuring two different positions of the lens along the optical axis corresponding to internal optical surfaces of the lens; and calculating a radius of curvature of an internal optical surface of the lens as a function of the measured value.

* * * * *